Inventor
William W. Sayers
By L. Donald Meyers
Attorney

June 22, 1943.    W. W. SAYERS    2,322,474
CONVEYER
Filed April 28, 1941    7 Sheets-Sheet 4

Inventor
William W. Sayers
Attorney

June 22, 1943.  W. W. SAYERS  2,322,474
CONVEYER
Filed April 28, 1941  7 Sheets-Sheet 6

Fig. 8.

Inventor
William W. Sayers
By L. Donald Myers
Attorney

June 22, 1943.  W. W. SAYERS  2,322,474
CONVEYER
Filed April 28, 1941  7 Sheets-Sheet 7

Inventor
William W. Sayers
By L. Donald Myers
Attorney

Patented June 22, 1943

2,322,474

UNITED STATES PATENT OFFICE 2,322,474

CONVEYER

William W. Sayers, Chicago, Ill., assignor to Link-Belt Company, a corporation of Illinois Application April 28, 1941, Serial No. 390,797

17 Claims. (Cl. 198—168)

This invention relates to new and useful improvements in conveyers adapted to transport in bulk flowable materials which may take the form of lumps, granules, powders, or other comminuted materials.

In my prior Patent Number 2,235,854, issued March 25, 1941, I have disclosed and generically claimed conveyers, elevators, and conveyer-elevators having solid flights which are shaped so that they will readily discharge materials through appropriate openings formed in the walls of vertical casing legs without carrying any material over to and down the return legs. Certain flights of this patent are provided with exterior material moving surfaces which consists of two inclined flat portions that are so angularly arranged with respect to each other and to their path of travel as to form a peak or ridge line at their juncture on the advance side of the flight. Such an arrangement of inclined flat portions and peak or ridge lines results in effecting gravitational flow of the conveyed material in opposite directions relative to the direction of travel of the flights.

In this prior patent, the generically claimed invention is illustrated by flights of the aforementioned type which are of a size to substantially fill the cross-sectional area of a casing leg and which are attached to the links of the conveyer chain at their inner edge portions in such a manner that the peak or ridge lines will be parallel to the chain link joint axes. Consequently, as the flights move into the discharge chamber of a casing head section, approximately two-thirds of the material positioned between each adjacent pair of flights is immediately discharged outwardly, or away from the path of the conveyer chain.

Of the remaining material, some will spill laterally in opposite directions but the majority of it will be discharged inwardly around the conveyer chain. From the above discussion, it will be appreciated that, regardless of the angle of inclination of the inner flat surface portions, a substantial amount of the material conveyed between each adjacent pair of flights will be restrained against discharge with the initially released material.

The present invention is a modification of the generic invention covered by the aforementioned broad application and has for its primary purpose effecting discharge of a greater percentage of the conveyed material as the initial discharge and the releasing of any remaining material for discharge laterally in opposite directions. As a result, no material will be restrained by surface portions of the flights so as to be compelled to spill inwardly around the conveyer chain.

A further important object of the invention is the accomplishment of the aforementioned primary purpose by the arrangement of the flights with respect to the conveyer chain and by the size of the flights with respect to the cross-sectional area of their casing.

A more specific object of the invention is to provide a novel form of casing head construction which will cooperate with the previously referred to flight arrangements to limit the discharge of material entirely to lateral directions relative to the path of the conveyer chain.

Other objects and advantages of the invention will be apparent during the course of the following description.

In the accompanying drawings forming a part of this specification and in which like numerals are employed to designate like parts throughout the same.

Figure 1:
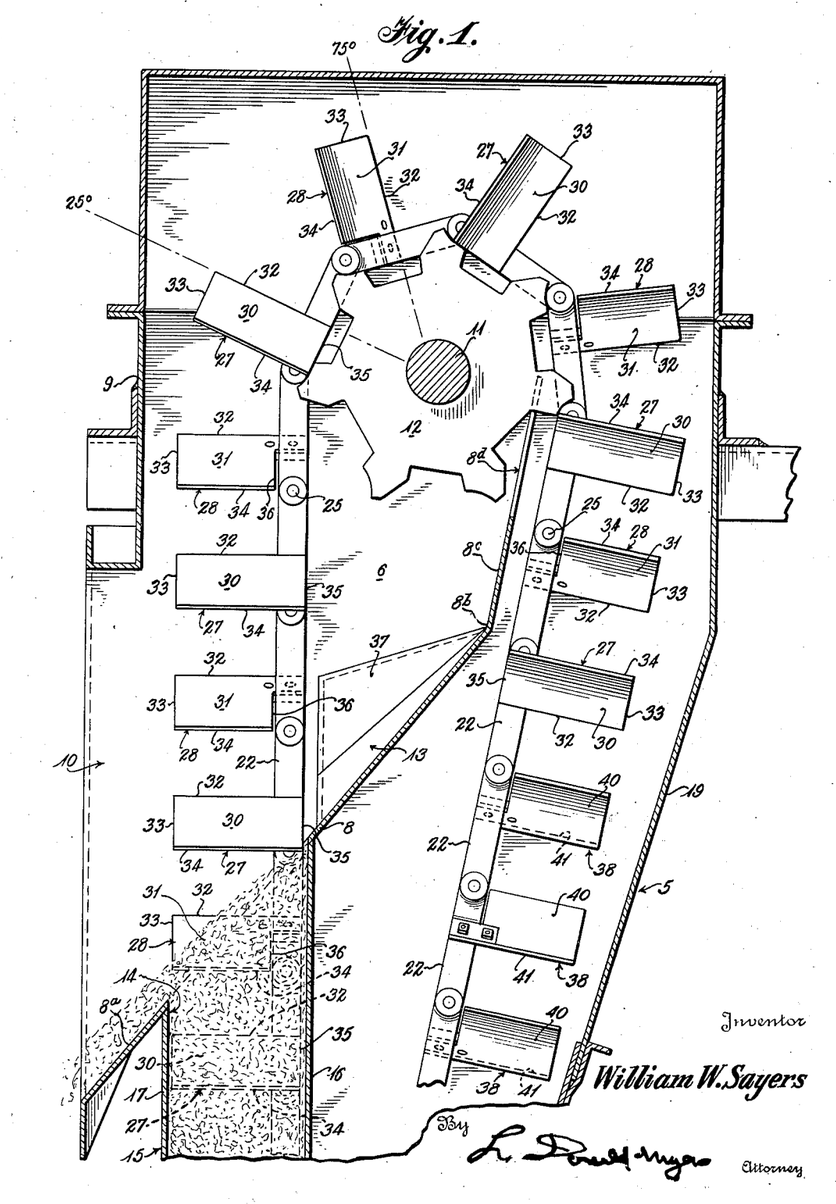
Figure 1 is a vertical sectional view of the head section of a conveyer or a conveyer-elevator casing with one form of material transporting mechanism associated therewith.
Figure 2:
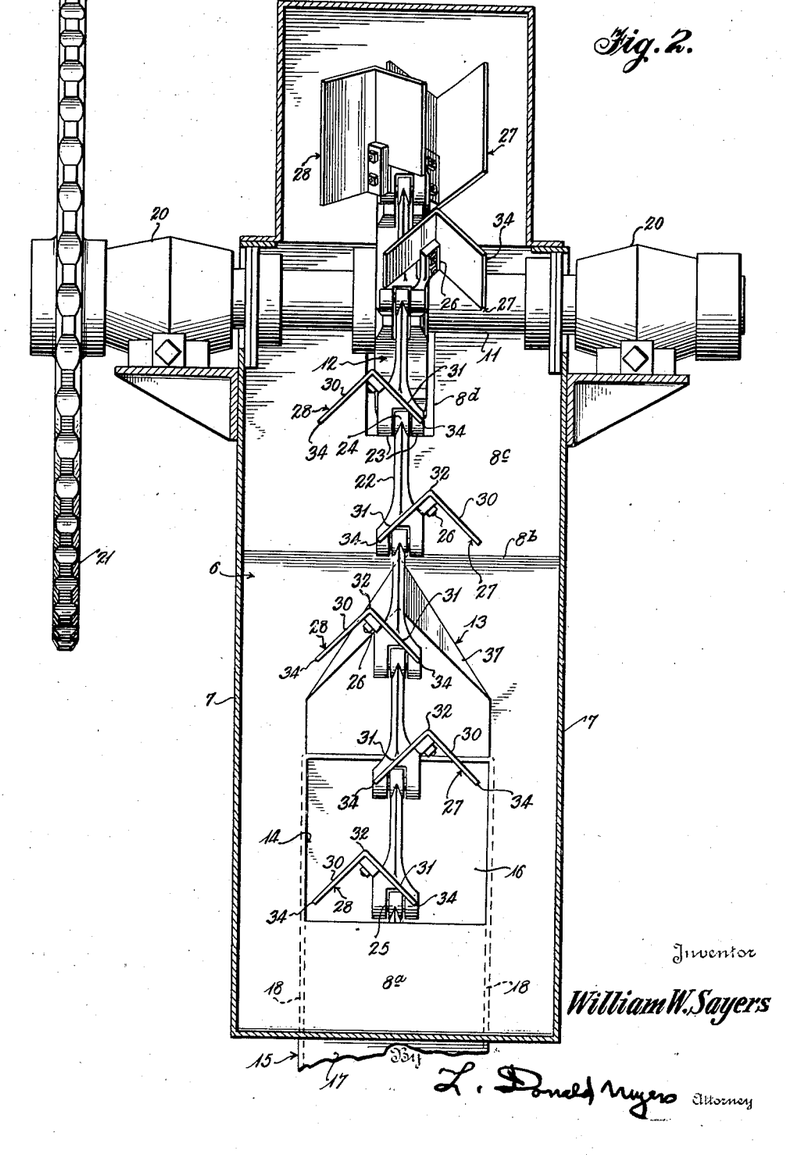
Figure 2 is a vertical sectional view of the conveyer structure shown in Fig. 1 but taken at right angles to this latter figure.

In the drawings, wherein for the purpose of illustration are shown the preferred embodiments of this invention, and first particularly referring to Figs. 1 and 2, the reference character 5 designates in its entirety the head section of a casing of a conveyer which, for example, may be of the L-type conveyer-elevator or of the loop-boot type elevator. This casing head section will not be described in detail because it is fully disclosed and claimed in the patent to Ferdinand F. Waechter, No. 2,235,856, issued March 25, 1941.

Insofar as the present invention is concerned, this casing head section includes a discharge chamber 6 which is defined by the side walls 7, the sloping discharge chute 8, and the outer or front wall 9. This front wall is interrupted by the discharge opening 10 through which all of the material transported by the conveyer is discharged. The material discharge chute is made up of the main body part 8a which extends from the bottom margin of the discharge opening 10 at an inclination of at least 45° to the line 8b where it merges into a second portion 8c that is slotted at its upper portion, as at 8d. It will be noted by inspecting these Figs. 1 and 2 that the inner portion of the main body part 8a extends diagonally inwardly and upwardly of the casing head section so as to underlie the shaft 11 that carries and drives the head wheel 12. The discharge chute extension 8c is inclined at a greater angle than the main body portion 8a and extends above the bottom dead center of the head wheel 12 to lie on opposite sides of the latter. The slot 8d formed in this extension of the discharge chute accommodates the head wheel teeth as they travel downwardly and inwardly of the shaft 11.

The main body portion 8a of the discharge chute has formed in or attached to its inner portion a flow splitting wedge 13 which functions to divide and spread laterally any material which is discharged over the inner edges of flights as they emerge from the confining casing sides and later as they pass around the uphill quarter section of the head wheel 12. This splitting and lateral spreading of the inwardly discharged material directs the latter into the side portions of the main part 8a of the discharge chute so that the material will pass around the outlet end 14 of the vertical casing leg 15 through which the conveyed material is raised to be emptied into the discharge chamber 6. This active leg of the casing is illustrated in Figs. 1 and 2, and in other figures to be referred to later, as being of rectangular formation in transverse section. It is to be understood, however, that the various casing legs can be square in transverse section as well as rectangular. Such a change in the shape of the casing leg section will in no way modify the mode of operation or results accomplished by the forms of flights which will be described in detail as this disclosure of the invention proceeds.

This casing leg includes a rear wall 16, a front wall 17, and the two side walls 18. Due to the inclination of the main body portion 8a of the discharge chute and the fact that the active casing leg 15 does not extend above the inclined plane of the discharge chute, the upper margin or end of the casing leg is beveled off or cut diagonally as shown with the result that the top edge of the inner or rear wall 16 extends above the top edge of the outer or front wall 17 while the top edges of the side walls 18 are inclined.

The return path of the material transporting mechanism is defined by the upper portion of the discharge chute 8a and the extension 8c, as well as by the rear wall 19 of the casing head section and the inner or rear wall 16 of the active casing leg 15. This path constitutes the start or upper end of the return leg of the casing.

In Fig. 2, the shaft 11 for the head wheel 12 is illustrated as extending outside of the casing head section to be supported by the bearings 20. A suitable drive element 21, which is shown as a sprocket wheel but which may just as well be a belt pulley, is suitably attached to one end of the shaft which extends beyond one of the bearings.

Figures 5, 6:
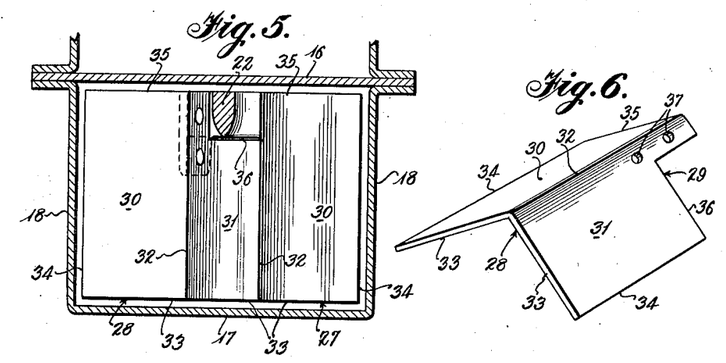
Figure 5 is a transverse sectional view of a conveyer casing leg with the material transporting mechanism shown in Figs. 1 and 2 arranged therein.
Figure 6 is a perspective view of one of the flights shown in Figs. 1, 2, and 5.

Referring now to Figs. 1, 2, and 5, there is disclosed one form of material transporting mechanism which embodies this invention. This mechanism includes a transmission or drive chain which is made up of the several articulated links 22. The trailing end of each one of these links, as is best illustrated in Fig. 2, includes spaced ears 23 which are adapted to receive between the same the single ear 24 of the leading end of the next succeeding link. A suitable chain pin 25 is employed to complete each chain joint and it passes through the pitch holes of the aligned ears of adjacent links. It will be noted by inspecting the several figures, and particularly Fig. 5, that the intermediate portions of the links are of wedge shape in transverse section so that they will shed material which might otherwise come to rest on these portions of the links and be carried over the head wheel to be discharged down the return leg of the casing. Fig. 2 discloses the trailing, or double eared, end of each link as being provided with an attachment lug 26 which is employed for securing a flight to the link. It will be noted that the attachment lugs of adjacent links are located on opposite sides of the latter, or so as to provide mounts for right- and left-hand flights.

In addition to the transmission or drive chain formed of the links 22, the material transporting mechanism of Figs. 1, 2, 5, and 6 includes solid flights which are capable of moving solid flowable materials in bulk when the transporting mechanism is confined within an active casing leg against gravitational discharge. In the assembly of these figures, two different types of flights are disclosed. Both of these flights are only intended to occupy a fractional portion of the cross-sectional area of an active casing leg. In their preferred form, they occupy slightly more than one-half the cross-sectional area of the casing. That is, half of them are right-hand flights, while the other half are left-hand flights. Each flight is secured to its respective attachment lug 26 and has its outer, lateral or side, and inner free edges cooperatively associated with an appropriate fraction of a casing leg outer wall, the full width or depth of one casing leg side wall, and an appropriate fractional portion of a casing leg outer wall, the full width or depth of one casing leg side wall, and an appropriate fractional portion of a casing leg inner or rear wall, respectively. The flights preferably terminate at one lateral or side edge in alignment with the side of the chain link which is farthest removed from the casing leg side wall with which the particular flight cooperates. In other words, each flight extends approximately the full width of its chain link and then over to one side wall of the casing leg. The flights, therefore, will only partially overlap in the direction of travel of the transmission chain, and the extent of overlap preferably will correspond with the width of the trailing, or double eared, end of the respective links. Of course, the flights may be varied in size so that they will overlap to a greater or lesser extent, as desired.

By inspecting Figs. 1 and 5, it will be seen that the transmission chain follows a path which lies closely adjacent the inner wall 16 of the casing leg, while the outer, inner, and latter or side edges of the right- and left-hand flights, when considered as a pair, uniformly approach the four walls of the casing leg. The amount of clearance left between these outer edges of the flights and the cooperating walls of the casing leg will depend entirely upon the character of material being transported.

Coming now to the actual flights, the right-hand flights are designated by the reference character 27 while the left-hand flights are designated by the reference character 28. Fig. 6 discloses in detail a left-hand flight 28. It is believed a complete description of this flight will serve for the right-hand flights as well, because the two flights are identical with the exception of the location of the notch or cut away portion 29 which accommodates the transmission chain link to which the flight is attached.

It will be noted that the flight shown in Fig. 6 is made up of two flat portions 30 and 31. These flat portions are angularly arranged with respect to each other so as to form a ridge or peak line 32 at their juncture. These flat portions may be arranged at any desired angle with respect to each other, but the present illustration shows an angle of approximately 90°. The outer or front edges 33 of both portions 30 and 31 are arranged to occupy a common plane. When the flight is traveling through a casing leg, this plane will be parallel with the outer or front wall 17 of the leg. The two portions 30 and 31 have side or lateral edges 34 over which the conveyed material is intended to spill. These side or lateral edges are parallel with each other and are parallel with the side walls 18 of a casing leg through which the flight is traveling. The inner or rear edges 35 and 36 of the flight portions 30 and 31 are arranged in parallel planes because the edge 36 constitutes one margin of the chain link receiving notch 29. These edges 35 and 36 will be arranged in parallelism with the inner or rear wall 16 of a casing leg when traveling therethrough. Apertures 37 are formed in the part 31, substantially between the notch 29 and the peak or ridge line 32. These apertures accommodate securing devices, such as bolts or rivets, by means of which the flight is attached to its chain link lug 26. The right-hand flights differ from the left-hand flights only by having the notch 29, and the apertures 37, formed in the opposite flat portion, i. e., the left-hand flat portion, of the flight. In all of the right- and left-hand flights, the reference character 30 will be applied to the flat portion which is uninterrupted, while the reference character 31 will apply to the flat portion that has the notch 29 cut therein.

By inspecting Fig. 2, it will be seen that the right- and left-hand flights are staggered with respect to each other and have their peak lines positioned so as to follow two paths which are arranged on opposite sides of the transmission chain. The staggering of the flights in this manner and the use of flights which have their flat portions arranged at the same angle causes one portion of each flight to be arranged in a plane which is parallel to a portion of either one of its adjacent flights. In other words, the surface portions 30 of the several flights are arranged in parallelism with the surface portions 31 of adjacent flights, or the flights located on the opposite sides of the chain. All right-hand flights have both of their surface portions 30 and 31 arranged in parallelism with all other right-hand flights. The same is true with the left-hand flights.

With the flight portions 30 and 31 forming a 90° angle, the attaching of the flights to the chain links in the manner illustrated in Figs. 1 and 2 arranges the portions 30 and 31 at an angle of inclination of 45°. Of course, the two portions of a given flight may be arranged to form either a greater or a lesser angle and thereby vary their angles of inclination. Also, the attachment lugs 26 may be varied in shape so that they will support the flights in a manner to give the portions 30 and 31 of each flight different angles of inclination.

Figs. 1, 2, and 5 clearly illustrate these half flights as being arranged so that their peak lines 32 extend at right angles to the path followed by the chain links when the transporting mechanism is traveling through a straight casing leg. This arrangement also places the peak lines 32 at right angles to the inner and outer casing leg walls 16 and 17, respectively. The inclination of the portions 30 and 31 of each flight are such that they will spill or discharge material laterally in opposite directions when the flights pass into the discharge chamber 6 from the casing leg 15.

If we assume that the angle of repose of the material being conveyed is no greater than 45°, the right- and left-hand flights will completely discharge the material supported by the portions 30 and 31 as the flights move into the discharge chamber 6. If the angle of inclination of either one of the flight portions 30 or 31 is less than the angle of repose of the material being transported, a certain portion of the material will remain on the flight portion, or flight portions, having this lesser angle. This retained material will be carried on the flights until they start traveling around the uphill quarter section of the head wheel 12. As the flights travel around the head wheel, the portions 30 and 31 are shifted so that an angle of inclination from their inner edges 35 and 36 to their outer edges 33 is developed. This angle increases from 0° to 90°, the 90° angle being reached as the flights pass the top dead center of the head wheel. As very few materials have an angle of repose of greater than 50°, the aforementioned material remaining on the flight portions will be discharged inwardly over the inner edges 35 and 36 of the flights prior to arrival of the flights at the top dead center of the head wheel.

Figs. 1 and 2 disclose the flow splitting wedge 13 as being properly located beneath the head wheel 12 so that any material spilled over the inner edges of the flights will fall on this flow splitting wedge and will be spread laterally by the top sloping surfaces 37. This laterally deflected material will be deposited on the side portions of the material gathering and feeding chute 8 and will be carried around the upper discharge end of the conveyer casing leg 15 for discharge through the opening 10.

Figures 3, 4:
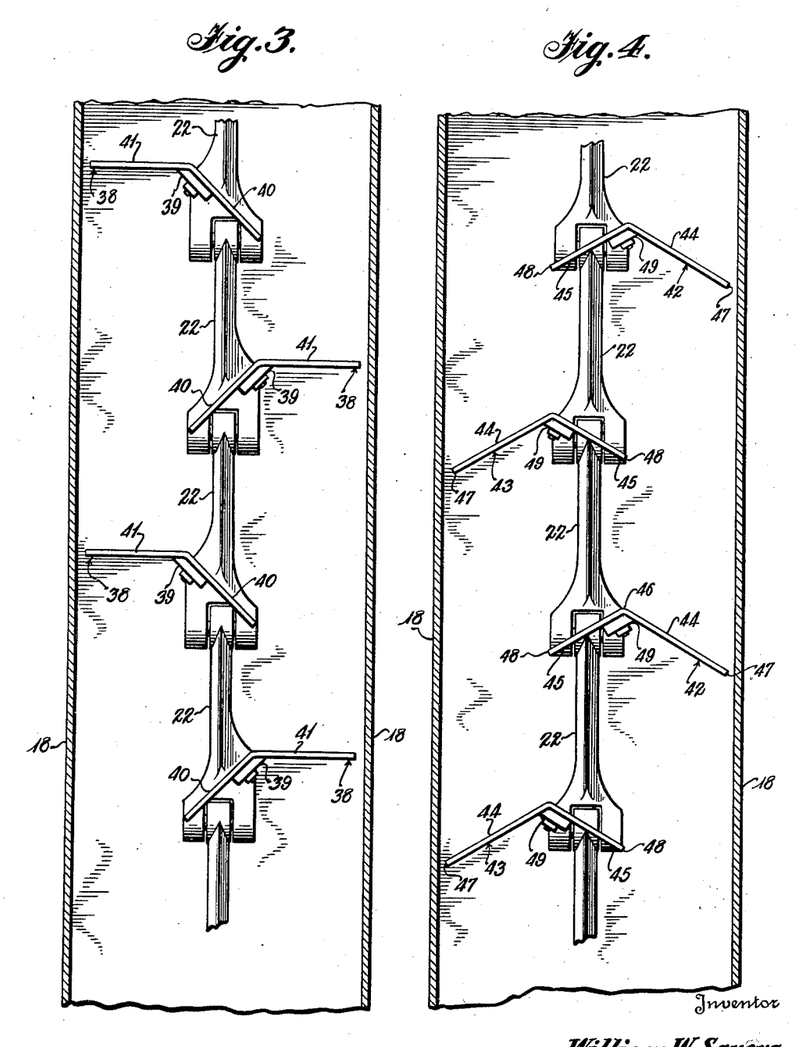
Figure 3 is a detail view, partly in vertical section and partly in elevation of a section of a material transporting mechanism which may form a part of the mechanism of Figs. 1 and 2 or the mechanisms of the figures to be described when the flights disclosed in this Fig. 3 are employed for cleaning out vertical casing legs.
Figure 4 is a view similar to Fig. 3 but illustrates a modified form of conveyer flight.

It is highly desirable to be able to completely empty or clean out all portions of a conveyer casing at the end of an operating period to permit the casing to be maintained in a sanitary condition, when certain materials are being handled, or to permit the conveyer to handle different types of materials during consecutive operating periods. The flights 27 and 28 will successfully operate to clean out all types of materials from horizontally extending casing portions, but they are not entirely satisfactory to clean all types of materials out of vertically extending casing legs. Therefore, to render the conveyer capable of handling all types of materials, and clean out both horizontal and vertical casing legs expeditiously, it is desirable to employ one or more groups of special clean-out flights. Such a group should consist of at least one right-hand and one left-hand flight. Any desired larger number of clean-out flights may be provided in a group. Fig. 1 discloses three such flights 38. Fig. 3 discloses four clean-out flights 38 in a group. The clean-out flights will be described in detail in connection with these two figures.

Each clean-out flight is attached to a separate chain link 22 by means of an attachment lug 39. Each one of the right- and left-hand flights 38 is provided with a laterally inclined, flat portion 40 and a horizontally arranged flat portion 41. That is to say, the flat portions 41 are normal to the axis of the chain links 22 and the side walls 18 of the casing leg through which the flights pass. These clean-out flights are illustrated in Fig. 3 as being staggered and as overlapping throughout the width of their inclined portions 40. Of course, other degrees of overlap may be provided if desired. The flight portions 41 cooperate with the associated wall portions of the conveyer casing at their outer edges and form shelves which will lift the materials up vertical casing legs for delivery to the discharge chamber of the casing head section. As these flight portions 41 are horizontally arranged when the flights are traveling up a vertically arranged casing leg and through a vertical path in the discharge chamber, a certain amount of material will remain resting on each flight portion as it passes through the discharge chamber to the head wheel 12. As these cleanout flights pass around the uphill quarter section of the head wheel, the flight portions 41 develop an angle of inclination which increases to the point of passage of the flights over the top dead center of the wheel. Their angles of inclination at this point will be 90° and the material will be discharged prior to the development of this maximum angle.

The clean-out flight portions 40 may be arranged at any desired angle of inclination. In the illustrated embodiment, the angle is 45°.

Although Fig. 1 discloses the flights 38 as being clean-out flights employed in combination with the principal material moving flights 27 and 28, it will be appreciated that a complete material transporting mechanism may be provided by employing nothing but flights 38. That is to say, each chain link 22 would have a flight 38 attached to its attachment lug and no flights of the character identified by the numerals 27 and 28 would be employed in this assembly.

Fig. 4 discloses right- and left-hand flights 42 and 43 which are of the same general character as the right- and left-hand flights 27 and 28 illustrated in Figs. 1, 2, 5, and 6 but differ therefrom in two respects. The first difference is that the flight portions 44 and 45 are arranged relative to each other so as to form an angle of approximately 120°. The angles of inclination of the two portions 44 and 45, therefore, are each 30°. Because of this reduction in angle of inclination, the distance between the peak or ridge line 46 and the side or lateral edge 47 of the flight portions 44 is greater than the distance between the peak or ridge line 46 and the side or lateral edge 48 of each flight portion 45. This increase in width of the portions 44 is necessary to properly locate their side or lateral edges 47 with respect to their associated casing leg side walls 18.

It further will be noted by comparing the disclosure of Fig. 4 with the disclosure of Fig. 2 that the lateral or side edges 47 of the flight portions 44 of Fig. 4 trail, or are arranged rearwardly of, the lateral or side edges 48 of the flight portions 45, whereas the edge portions 34 of Fig. 2 are arranged in the same plane.

By employing an angle of inclination of 30° for the flight portions 44 and 45, all of the material supported by the flights will not be discharged as the flights pass into the discharge chamber of the casing head section shown in Figs. 1 and 2 if the angle of repose of the material being transported is greater than 30°. This remaining material will be discharged over the inner edges of the flights 42 and 43 as these flights pass around the uphill quarter section of the head wheel 12. This inward discharge, of course, is brought about by the development of an angle of inclination from the inner to the outer edges of these flights as they travel around the head wheel.

Attachment lugs 49 are employed for securing these right- and left-hand flights 42 and 43 to the chain links 22.

Figure 7:
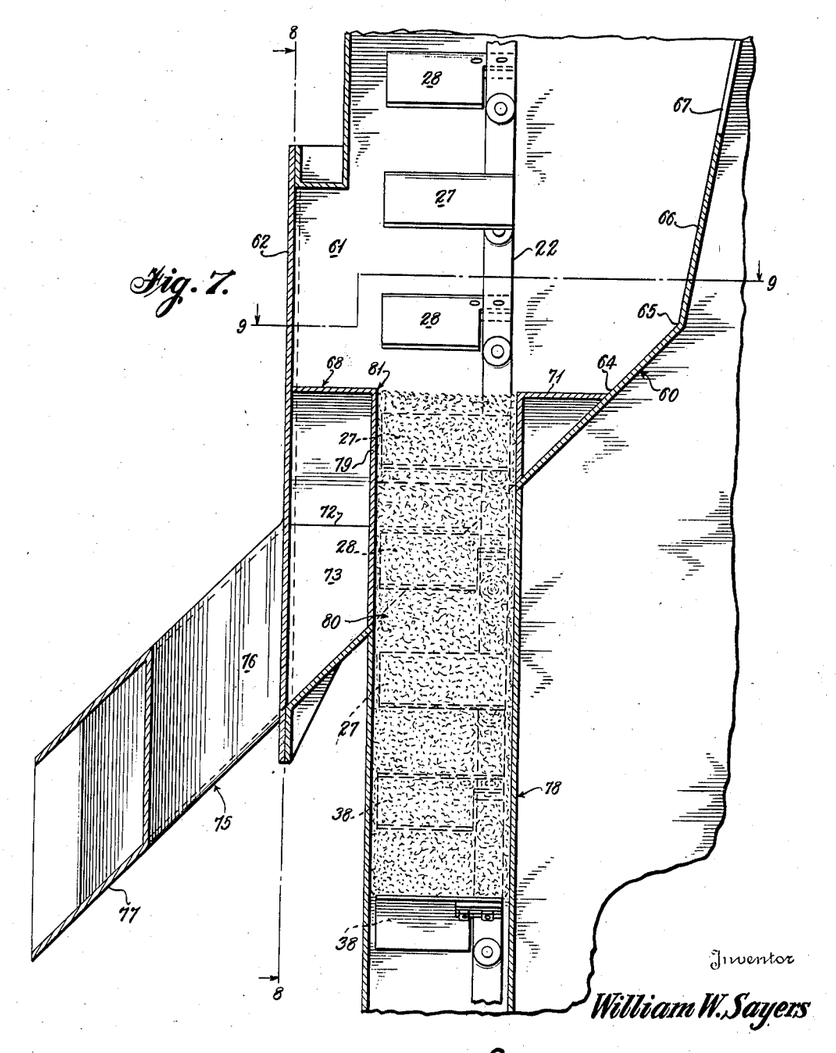
Figure 7 is a fragmentary vertical sectional view of the casing head section of a conveyer or a conveyer-elevator of a modified form with the material transporting mechanism of Figs. 1, 2, 5, and 6 associated therewith.
Figure 8:
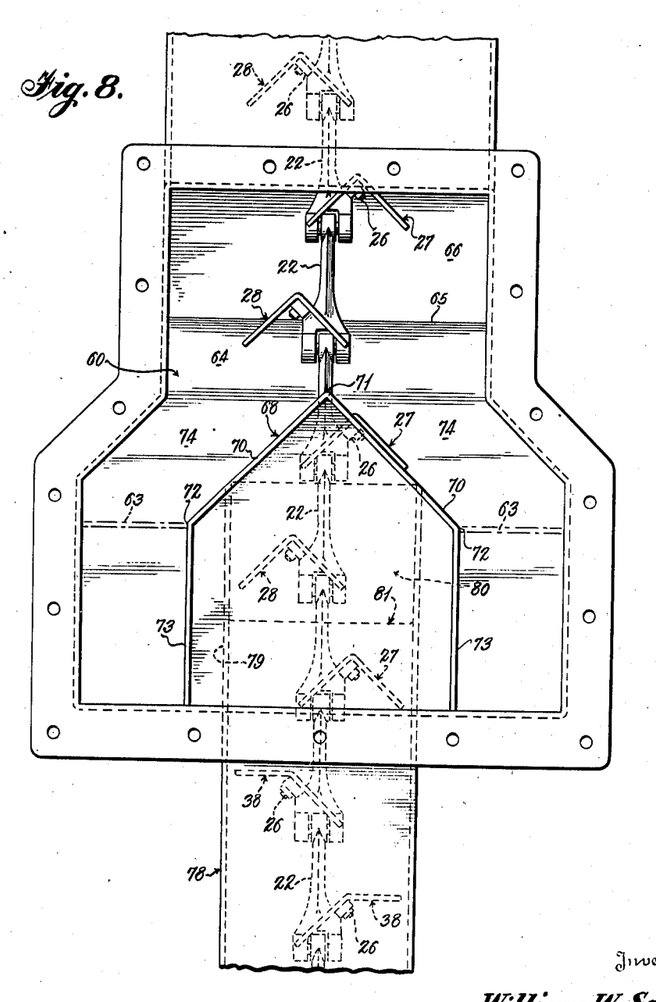
Figure 8 is a vertical sectional view taken on line 8—8 of Fig. 7.
Figure 9:
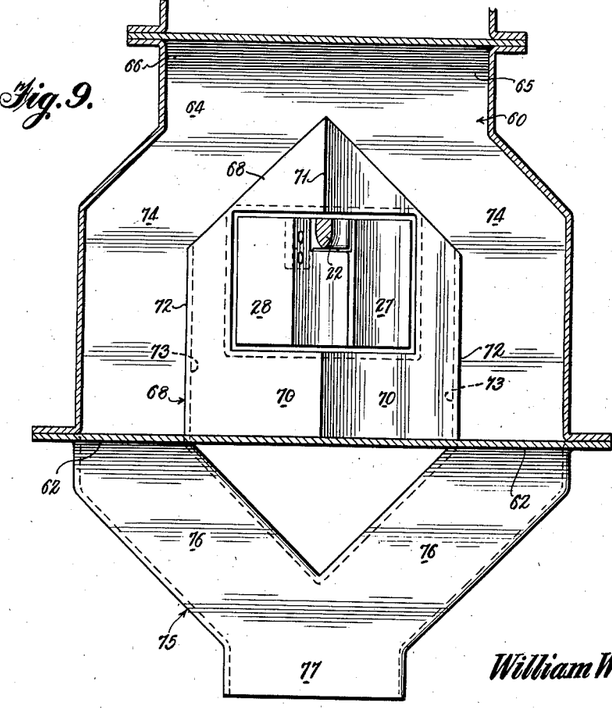
Figure 9 is a horizontal sectional view taken on lines 9—9 of Fig. 7, and Figures 10 to 13 inclusive are fragmentary perspective views of modified forms of flow splitting wedges which may be employed in place of the wedge of Figs. 7 to 9 inclusive.

Figs. 7 to 9, inclusive, disclose a modification of the invention which involves the discharge chamber of the casing head section. To be more specific, the material gathering and discharge chute and the flow splitting wedge of Figs. 1 and 2 have been modified to cause them to cooperate in a different manner with the lateral discharge of materials effected by the types of flights more specifically described in connection with Figs. 1 to 6, inclusive. These figures only disclose the modified form of discharge chamber and a limited section or portion of a material transporting assembly. It is to be understood, however, that the balance of the casing head section, head wheel, etc., disclosed in Figs. 1 and 2 will be employed with the mechanism of Figs. 7 to 9, inclusive, and will correspond identically with the disclosures of Figs. 1 and 2.

Fig. 7 discloses a material gathering and discharge chute 60 which forms the bottom and rear wall of the material discharge chamber 61. The front wall of this chamber is designated by the reference character 62 and is closed with the exception of the two laterally spaced openings 63 illustrated in Fig. 8. The chute 60 includes the main body portion 64 which is inclined at any desired angle but an angle of at least 45° is preferred. This main body portion 64 extends to a line of juncture 65 where it joins with an extension 66 that is preferably inclined at a greater angle. A head wheel receiving notch 67 is formed in the upper portion of this extension 66.

Rising from the central part of the main body portion 64 of the chute 60 is a flow splitting wedge 68. Figs. 7 and 9 clearly illustrate this flow splitting wedge as including the laterally sloping top surfaces 70 which form at their line of juncture a peak 71. This peak is illustrated as extending substantially horizontally from a desired part of the main portion 64 of the chute forwardly to the front wall 62 of the discharge chamber 61. The laterally sloping top surfaces 70 of the wedge extend downwardly to the lines 72 where the top surfaces join with perpendicular side walls 73. It will be appreciated that this flow splitting wedge structure is hollow and of substantially triangular formation in the vertical section illustrated in Fig. 7. The front of this hollow wedge is closed by the front wall 62 of the discharge chamber 61.

Because the flow splitting wedge 68 rises from the main body portion 64 of the discharge chute, this chute is divided into the two passageways 74, which are best illustrated in Figs. 8 and 9. The lower ends of these two passageways register with the previously referred to discharge openings 63 formed in the front wall 62. This front wall is omitted from the disclosure of Fig. 8 to better illustrate the vertical shape or contour of the flow splitting wedge.

Figs. 7 and 9 disclose a material discharge spout 75 which includes the two branches 76 and the main body 77. The branches 76 register with the two openings 63 formed in the front wall 62 of the discharge chamber 61. Therefore, any material flowing down the two passageways 74 of the material discharge and gathering chute 60 will enter the branches 76 of the spout and flow through these branches into the main body part 77. This main body part, of course, may be connected to any desired form of conduit, or the like, which will carry the material away to a point of use or disposal.

The vertical casing leg 78 extends up to the main body portion 64 of the material gathering and discharge chute 60 and is joined to this chute at its upper end in any suitable manner. An extension 79 of this vertical leg 78 is positioned within the flow splitting wedge 68 and terminates at its upper end flush with the laterally sloping surfaces 70 of the wedge. The portion 64 of the chute is provided with an opening 80 through which the bore of the casing leg 78 and extension 79 communicate. The sloping surfaces 70 of the flow splitting wedge are provided with a material discharge opening 81 which registers with the open upper end of the casing leg extension 79. It will be appreciated, therefore, that any material which is carried into the discharge chamber 61 passes through this opening 81 of the flow splitting wedge and the material will spill over onto the sloping top surfaces 70 of the wedge or onto the passageways 74 of the material gathering and feeding chute.

Figs. 7 to 9, inclusive, disclose a material transporting mechanism of the character illustrated specifically in Figs. 1, 2, 5, and 6; i. e., a mechanism made up of chain links 22 to which right-hand and left-hand half flights 27 and 28, respectively, are secured either exclusively or in combination with a desired number of clean-out flights 38. These flights 27, 28, and 38 are identical in construction with the elements bearing the same reference characters in the preceding figures. Therefore, it should not be necessary to again specifically describe the construction of these several flights. The same reference characters will be applied to detail features of construction to enable them to be identified in these Figs. 7 to 9, inclusive.

It will be appreciated that the flights 27, 28, and 38 are of such designs that they will directly cooperate with the flow splitting wedge 68 to bring about lateral discharge of the conveyed material onto the sloping top surfaces 70 of the wedge and, to a limited extent, directly onto the passageways 74. Any material delivered directly to the top surfaces of the wedge will flow down these wedges into the passageways. The angle of inclination of the top surfaces 70 of the wedge may correspond with the angles of inclination of the portions of the flights or a greater angle of inclination may be provided for the wedge surfaces 70. Although Figs. 7 to 9, inclusive, disclose the forms of flights shown by and described in detail in connection with Figs. 1, 2, 3, 5, and 6, it should be understood that the type of flight illustrated in Fig. 4 can readily be substituted for the flights actually illustrated. Also, a material transporting assembly made up entirely of the so-called clean-out flights of Fig. 3 could just as readily be employed with the discharge chamber mechanism of Figs. 7 to 9, inclusive. It should be understood, therefore, that any claims which are limited to the discharge chamber mechanism specifically illustrated in Figs. 7 to 9, inclusive, but which broadly recite flights are to be construed as being generic to the several types of flights and not specific to the flights actually shown in these latter figures.

Figs. 10 to 13 inclusive relate more specifically to the embodiment of the invention disclosed in Figs. 7 to 9 inclusive. That is to say, Figs. 10 to 13 inclusive disclose additional modifications of the flow splitting wedge which rises from the discharge chute and cooperates with the flights as they emerge from the upper end of the casing leg.

Figures 10, 11:
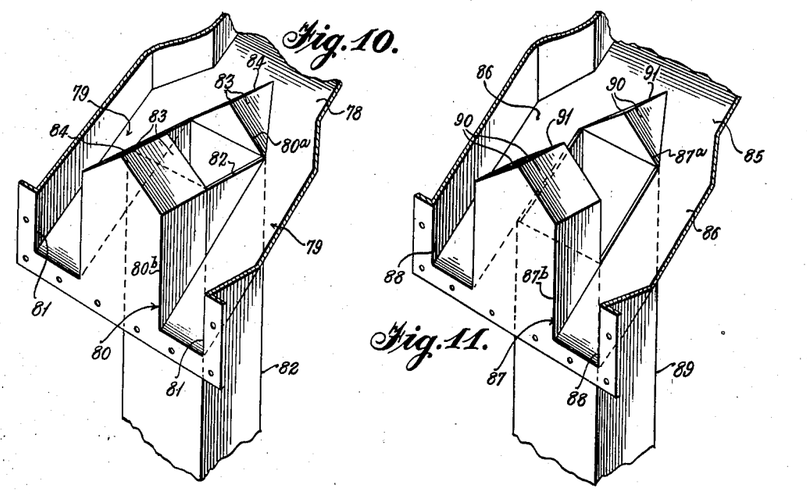

Fig. 10 discloses a discharge chute 78 which is divided into side passageways 79 by the flow splitting wedge structure 80. The front wall of the head casing section is formed with the two discharge openings 81 which register with the two side passageways 79.

The vertical casing leg 82 passes upwardly through the discharge chute 78 and terminates in a horizontally arranged upper edge 83. The side and front wall portions of the casing leg, therefore, extend above the discharge chute. The flow splitting wedge 80 is omitted above the open upper end of the casing leg and is of equal width to said leg. Therefore, the flow splitting wedge is really formed into a relatively small inner portion 80a and a taller outer portion 80b. Each one of these portions has the laterally sloping top surfaces 83 which merge at their upper ends to form the interrupted ridge line 84. The two portions of this ridge line are in alignment with each other and occupy a common horizontal plane.

The modification of Fig. 11 includes a discharge chute 85 which is divided into the two side passageways 86 by means of the flow splitting wedge 87. Discharge openings 88 are formed in the front wall of this head casing section to register with the side passageways 86.

The vertical casing leg 89 terminates at its upper end at the plane of the discharge chute 85 and, for that reason, does not have any of its side walls projecting above the chute. The flow splitting wedge 87 does not overlie the upper end of the casing leg 89 and, for that reason, is divided into two portions or sections 87a and 87b. Each one of these sections is provided with laterally sloping top surfaces 90 which merge into the ridge lines 91. This interrupted ridge line 91 is horizontally arranged and occupies a single horizontal plane.

Figure 12:
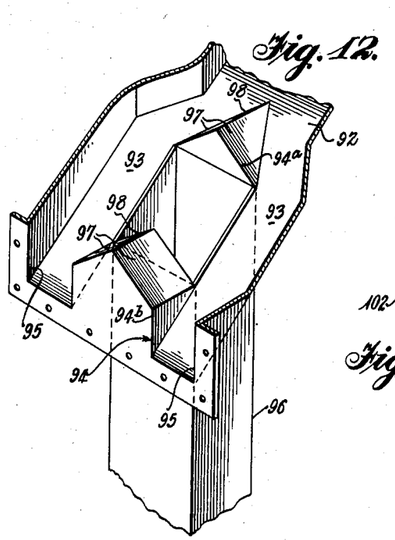

The modification of Fig. 12 includes a discharge chute 92 which is divided into the two side passageways 93 by the flow splitting wedge 94. The front wall of the casing head section is provided with discharge openings 95 which register with the side passageways 93.

The vertical casing leg 96 of this modification also terminates at its upper end in the plane of the discharge chute 92 and, for that reason, does not project above the chute at any side.

The flow splitting wedge 94 is divided into two parts or sections 94a and 94b by the casing leg 96. Each one of these wedge portions is provided with the laterally sloping top surfaces 97 which meet at their upper edges to form the ridge line 98. These ridge lines are horizontally arranged but do not occupy a common horizontal plane. This is due to the fact that the front wedge portion or section 94b is of reduced height and does not extend up to the level of the rear or inner wedge section or portion 94a. It can be said, therefore, that these two wedge sections are stepped with respect to each other.

Figure 13:
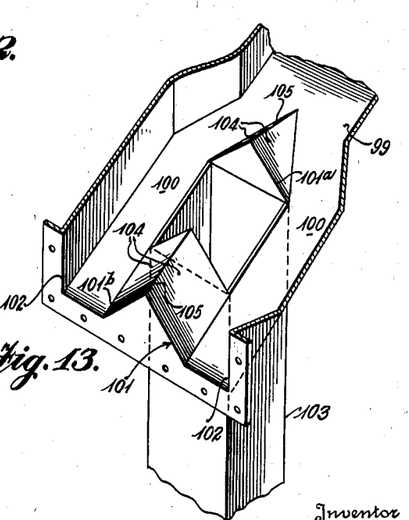

The modification of Fig. 13 includes a discharge chute 99 which is divided into the two side passageways 100 by the flow splitting wedge 101. The front wall of the casing head section is formed with the two discharge openings 102 that register with the lower ends of the side passageways 100.

The vertical casing leg 103 terminates at its upper, open end in the plane of the discharge chute 99 and, for that reason, has no side wall portion which projects above the chute.

As the flow splitting wedge 101 is not built over the upper open end of the casing leg 103 in any way, it is divided into two sections or portions 101a and 101b. Each one of the wedge sections or portions is formed with laterally sloping top surfaces 104 which meet at their upper edges to form the ridge line 105. The ridge line 105 for the wedge portion or section 101a is arranged in a horizontal plane. The ridge line 105 of the wedge section 101b is inclined at approximately the same angle as the inclined discharge chute 99. Being of this construction, this front or outer wedge section 101b is not provided with vertical side wall portions like the front or outer wedge sections of the modifications shown in Figs. 10 to 12 inclusive.

It will be noted that these wedge structures of Figs. 10 to 13 inclusive are all of equal width to the width of the associated casing legs and for that reason have no sloping top surface portions which are arranged on opposite sides of the upper ends of the casing legs. The material spilled laterally by the flights as they emerge from the upper ends of the casing legs will be delivered directly to the side passageways of the discharge chute and will not have to pass over sloping wedge surfaces before reaching these passageways. The two wedge sections or portions of each modification will receive the material which spills over the outer or front and inner or rear edges of the flights and will cause this material to flow laterally onto the sloping surfaces of the side passageways of the discharge chutes.

Although no material transporting mechanism is disclosed in any of Figs. 10 to 13 inclusive, it will be appreciated that the transporting mechanism illustrated in any of the preceding figures may be employed with any of these modified structures.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a conveyer, or the like, for transporting flowable solid materials in bulk, a flexible transmission member, and a series of flights spaced along said member and attached thereto to project from only one side thereof, the adjacent flights of said series being arranged so as to only partially overlap in the direction of travel of the transmission member, each of said flights having its entire exterior material moving surface formed of two portions which are angularly arranged with respect to each other, each one of said flights of the series having one surface portion which is inclined with respect to the direction of travel of the flights, certain of the flights of the series having their second surface portion normal to said direction, the remaining flights of the series having their second surface portion also inclined with respect to the direction of travel of the flights.

2. In a conveyer, or the like, for transporting flowable solid materials in bulk, a flexible transmission member, a plurality of flights spaced along said member and attached thereto at their inner edge portions, each of said flights comprising a plurality of flat portions which are angularly arranged with respect to each other so as to provide exterior material moving surfaces with a straight ridge line at their juncture, said ridge line extending at right angles to the longitudinal axis of the transmission member and from the inner edge to the outer edge of the flight.

3. In a conveyer, or the like, for transporting flowable solid materials in bulk, the combination with a vertical casing leg adapted to open into a discharge chamber at its upper end and having an inner wall and angularly arranged side walls, of a flexible transmission member adapted to travel a path adjacent the inner wall and centrally between the side walls, and a plurality of flights spaced along said transmission member and attached thereto at their inner edge portions, each of said flights consisting of two flat portions which are angularly arranged with respect to each other and are inclined rearwardly relative to the direction of travel of the conveyer and relative to the opposite side walls of the casing leg so as to spill material in the directions of said side walls upon entering said discharge chamber, each one of said flight portions having its inner and outer edges arranged in planes which are parallel to said inner casing leg wall.

4. In a conveyer, or the like, for transporting flowable solid materials in bulk, a transmission chain having a plurality of articulated links, and a solid flight rigidly attached at its inner edge portion to the trailing end of each link so as to project outwardly of and to only one side of said transmission chain, each of said flights comprising a plurality of flat portions which are angularly arranged with respect to each other so as to provide exterior material moving surfaces with a straight ridge line at their juncture, each of said ridge lines extending from a point adjacent the attachment edge portion of the flight to the outer edge of the flight.

5. In a conveyer, or the like, for transporting flowable solid materials in bulk, a transmission chain having a plurality of articulated links, and a solid flight rigidly attached at its inner edge portion to the trailing end of each link so as to project outwardly of and to only one side of the latter, each of said flights consisting of two flat angularly arranged portions which are inclined in the direction of travel of the flight and laterally in opposite directions relative to the path of the transmission chain so as to spill material by gravity sidewise in opposite directions relative to said path when traveling vertically without lateral support.

6. In a conveyer, or the like, for transporting flowable solid materials in bulk and at the same speed of travel as that of the conveyer, a flexible transmission member, and a series of flights spaced along said member and attached thereto at their inner edge portions, the adjacent flights of said series being arranged so as to only partially overlap in the direction of travel of the transmission member, each of said flights having its entire exterior material moving surface formed of two flat rectangular portions which are angularly arranged with respect to each other and are inclined rearwardly with respect to the direction of travel of the conveyer.

7. In a conveyer, or the like, for transporting flowable solid materials in bulk and at the same speed of travel as that of the conveyer, a flexible transmission member, and a series of flights spaced along said member and attached thereto at their inner edge portions, the adjacent flights of said series being arranged so as to only partially overlap in the direction of travel of the transmission member, each of said flights having its entire exterior material moving surface formed of two flat portions which are angularly arranged with respect to each other so as to form a ridge line which is located on the advance side of the flight and extends from the inner edge to the outer edge of the flight.

8. In a conveyer, or the like, for transporting flowable solid materials in bulk and at the same speed of travel as that of the conveyer, the combination with a vertical casing leg adapted to open into a discharge chamber at its upper end and having an inner wall and angularly arranged side walls, of a flexible transmission member adapted to travel a path adjacent the inner wall and centrally between the side walls, and a series of flights spaced along said transmission member and attached thereto at their inner edge portions, the adjacent flights of said series being arranged so as to only partially overlap in the direction of travel of the transmission member, each of said flights having its entire exterior material moving surface formed of two flat portions which are angularly arranged with respect to each other and are inclined in opposite directions so as to provide a ridge line which is located on the advance side of the flight, said arrangement of the flight surface portions causing the material to be spilled sidewise in opposite directions when the flights enter the discharge chamber.

9. In a conveyer, or the like, for transporting flowable solid materials in bulk and at the same speed of travel as that of the conveyer, a flexible transmission member, and a series of flights spaced along said member and attached thereto to project from only one side thereof, the adjacent flights of said series being arranged so as to only partially overlap in the direction of travel of the transmission member, each of said flights having its entire exterior material moving surface formed of two flat, rectangular portions which are angularly arranged with respect to each other, each one of said flights of the series having its overlapped surface portion inclined rearwardly with respect to the direction of travel of the flights, certain of the flights of the series having their second surface portion normal to said direction of travel and out of overlapped relation with respect to next adjacent flights.

10. In a conveyer, or the like, for transporting flowable solid materials in bulk, a flexible transmission member, and a series of flights spaced along said member and attached thereto, the adjacent flights of said series being arranged so as to only partially overlap in the direction of travel of the transmission member, each of said flights having its entire exterior material moving surface formed of two flat rectangular portions which are angularly arranged with respect to each other so as to form a ridge line which is located on the advance side of the flight, the said ridge lines of adjacent flights of the series being arranged to travel in parallel planes located on opposite sides of the axis of the transmission member.

11. In a conveyer, or the like, for transporting flowable solid materials in bulk, a flow splitting wedge having oppositely laterally sloping material directing top surfaces, a vertical casing leg having its upper end opening through said flow splitting wedge, and a material transporting device including a plurality of interconnected flights traveling through the casing leg and the flow splitting wedge to cause the conveyed material to spill onto the top surfaces of said wedge as the material is carried thereabove, each of said flights being shaped to provide oppositely laterally sloping material spilling top surfaces similar to the top surfaces of said flow splitting wedge.

12. In a conveyer, or the like, for transporting flowable solid materials in bulk, a flow splitting wedge having oppositely laterally sloping material discharging top surfaces, a vertical casing leg having its upper end opening through said flow splitting wedge, and a material transporting device including a flexible transmission member and a series of flights spaced along said member and attached thereto in staggered relation so as to only partially overlap in the direction of travel of the transmission member, said flights traveling through the casing leg and the flow splitting wedge to cause the conveyed material to spill onto the top surfaces of said wedge as the material is carried thereabove, the staggered and partially overlapped arrangement of adjacent flights causing each flight to directly spill more material onto one top surface of the wedge than the other.

13. In a conveyer, or the like, for transporting flowable solid materials in bulk, a flow splitting wedge having oppositely laterally sloping material directing top surfaces, a vertical casing leg having its upper end opening through said flow splitting wedge, and a material transporting device including a plurality of interconnected flights traveling through the casing leg and the flow splitting wedge to cause the conveyed material to spill onto the top surfaces of said wedge as the material is carried thereabove, each of said flights being shaped to provide two flat surface portions which are angularly arranged with respect to each other so as to provide an exterior material moving surface, at least one of said surface portions being inclined rearwardly with respect to the direction of travel of the flight and arranged so as to correspond with the direction and angle of slope of a top surface of said wedge.

14. In a conveyer, or the like, for transporting flowable solid materials in bulk and at the same speed of travel as that of the conveyer, a flexible transmission member, and a series of staggered flights spaced along said member and attached thereto, each of said flights having its entire material moving surface shaped to spill material sidewise into opposite directions.

15. In a conveyer, or the like, for transporting flowable solid materials in bulk, a flexible transmission member, and a series of flights spaced along said member and attached thereto, each of said flights being of rectangular shape in plan and having an exterior material moving surface formed of a plurality of portions which are angularly arranged with respect to each other and are inclined rearwardly with respect to the direction of travel of the transmission member, the adjacent flights of said series being arranged with respect to each other so as to only partially overlap in the direction of travel of the transmission member with the overlapping being uniform throughout the depth of the flights, and so as to extend laterally in opposite directions from said overlapped portions to collectively define a material moving path which is of rectangular shape in cross section, the aforesaid arrangement of adjacent flights resulting in rapid spillage of the conveyed material as it passes into the discharge zone of the conveyer.

16. In a conveyer, or the like, for transporting flowable solid materials in bulk, the combination with a casing of rectangular formation in section and a flexible transmission member adapted to travel through said casing, of a series of flights spaced along said member and attached thereto, each of said flights having an exterior material moving surface formed of a plurality of portions which are angularly arranged with respect to each other and are inclined rearwardly with respect to the direction of travel of the transmission member, said flights being of rectangular shape in plan and of a size to only partially fill the cross sectional area of the casing and being staggered so that adjacent flights only partially overlap in the direction of travel of the transmission member, the flights of each adjacent pair being arranged to collectively bridge the cross section of the casing except for the necessary marginal clearance, the aforesaid arrangement of adjacent flights resulting in rapid spillage of the conveyed material as it passes into the discharge zone of the conveyer.

17. In a conveyer, or the like, for transporting flowable solid materials in bulk, the combination with a casing of rectangular formation in section and a flexible transmission chain formed of a plurality of articulated links, of a series of flights of rectangular shape in plan and with one of said flights attached to each link of the chain so as to be spaced a distance equal to one pitch of the chain, said flights each being of a size to only partially fill the cross sectional area of the casing and being staggered to provide right and left hand flights which only partially overlap in the direction of travel of the transmission chain, said flights each further having an exterior material moving surface formed of a plurality of portions which are angularly arranged with respect to each other and are inclined rearwardly with respect to the direction of travel of the transmission chain, each adjacent pair of right and left hand flights being arranged to collectively bridge the cross sectional area of the casing except for the necessary marginal clearance, the aforesaid arrangement of the flights of the series causing the overlapped portions of adjacent right and left hand flights to be spaced a distance of one chain pitch while the remaining portions of adjacent right hand flights and adjacent left hand flights are spaced two chain pitches, whereby rapid spillage of the conveyed material will occur as it passes into the discharge zone of the conveyer.

WILLIAM W. SAYERS.